United States Patent [19]
Olsen et al.

[11] 3,925,146
[45] Dec. 9, 1975

[54] METHOD FOR PRODUCING EPITAXIAL THIN-FILM FABRY-PEROT CAVITY SUITABLE FOR USE AS A LASER CRYSTAL BY VACUUM EVAPORATION AND PRODUCT THEREOF

[75] Inventors: Keith H. Olsen; Marvin H. Christmann, both of Bloomington, Minn.

[73] Assignee: Minnesota Mining and Manufacturing Company, St. Paul, Minn.

[22] Filed: Dec. 7, 1972

[21] Appl. No.: 312,957

Related U.S. Application Data

[63] Continuation of Ser. No. 96,390, Dec. 9, 1970, abandoned.

[52] U.S. Cl. ............... 156/601; 427/8; 427/86; 156/611
[51] Int. Cl. .................... B44d 1/18; C23c 13/02
[58] Field of Search ............ 117/201, 106 R, 106 A, 117/211, 213; 331/94.5; 148/175

[56] References Cited
UNITED STATES PATENTS

| | | | |
|---|---|---|---|
| 2,688,564 | 9/1954 | Forgue | 117/106 R |
| 2,879,739 | 3/1959 | Bugbee | 117/107.1 |
| 2,997,408 | 8/1961 | L'Heureax | 117/201 |
| 3,065,112 | 11/1962 | Gilles | 117/106 R |
| 3,113,040 | 12/1963 | Winston | 117/106 R |
| 3,146,123 | 8/1964 | Bischoff | 117/106 A |
| 3,466,191 | 9/1969 | Stinchfield | 117/106 R |
| 3,531,335 | 9/1970 | Heyerdahl | 117/201 |
| 3,661,636 | 5/1972 | Green | 117/201 |
| 3,692,572 | 9/1972 | Strehlow | 117/201 |

OTHER PUBLICATIONS

Holland, Vacuum Deposition of Thin Films, Wiley & Son, 1956, pp. 288–292 & 294–296.
Chem. Abstract, Vol. 70, No. 2, (1969), p. 684, (7157k), Koganovich.
Chem. Abstract, Vol. 67, (1967), p. 9749, (103451k), Magomedov.
Chem. Abstract, Vol. 65, (1966), p. 14570, (14570e), Zhdan.

*Primary Examiner*—Michael F. Esposito
*Attorney, Agent, or Firm*—Alexander, Sell, Steldt & DeLaHunt

[57] ABSTRACT

A vacuum evaporation and product thereof process useful for growing large surface area films useful as laser crystals comprising, during the growth process, heating a substantial portion of the reaction chamber interior surfaces to a temperature greater than the temperature of the substrate growth surface while drawing a vacuum on and controlling the rate of flow of vapor from the reaction chamber to a slow flow to prevent disproportionate loss of the higher vapor pressure elements through deposition onto the reaction chamber surfaces and exit from the reaction chamber to maintain a nearly stoichiometric mixture of the vapor in the reaction region adjacent the growth surface.

8 Claims, 1 Drawing Figure

U.S. Patent  Dec. 9, 1975  3,925,146
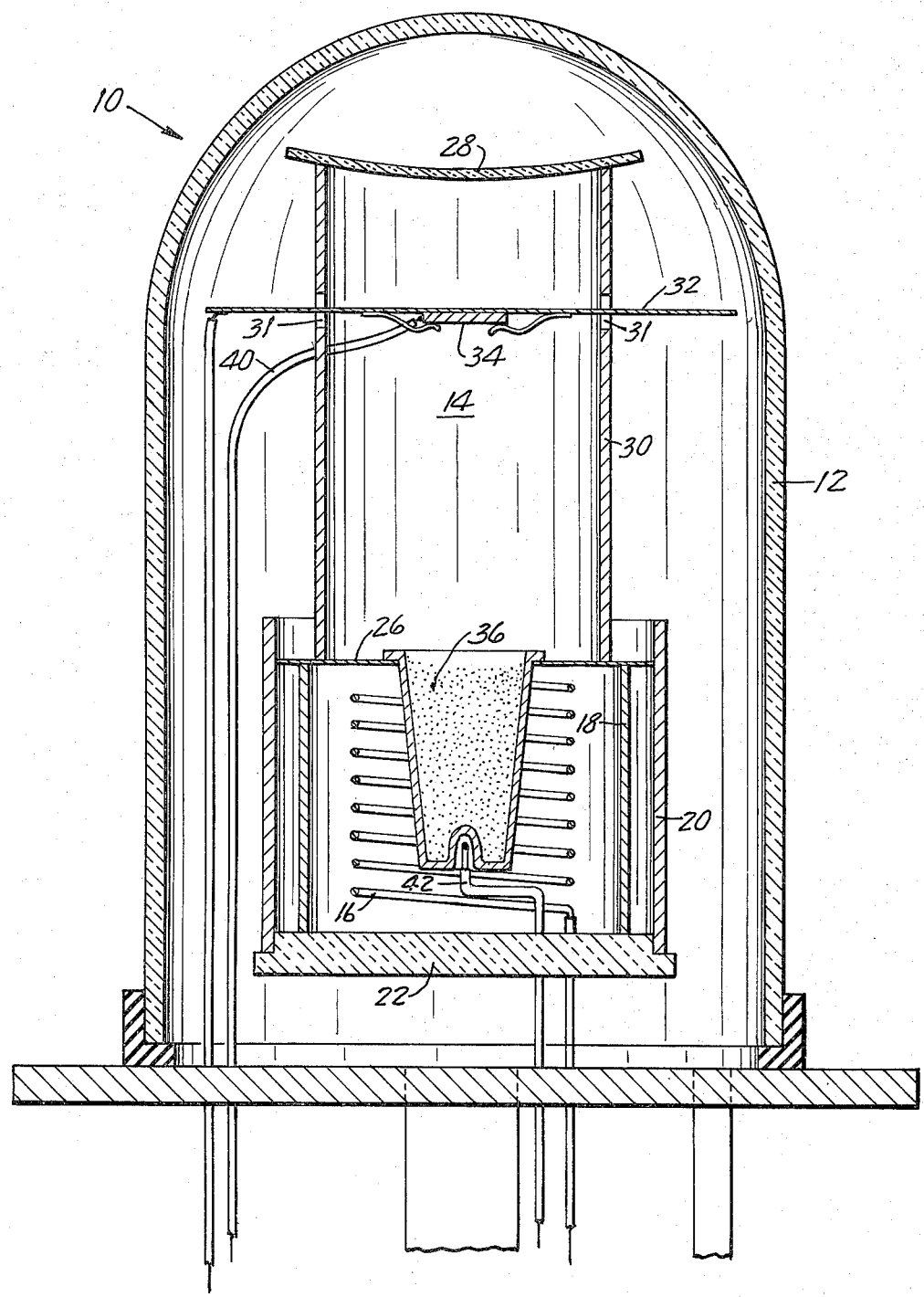

METHOD FOR PRODUCING EPITAXIAL THIN-FILM FABRY-PEROT CAVITY SUITABLE FOR USE AS A LASER CRYSTAL BY VACUUM EVAPORATION AND PRODUCT THEREOF

CROSS-REFERENCE TO RELATED APPLICATION

This application is a continuation of application Ser. No. 96,390, filed Dec. 9, 1970, which application is now abandoned.

BACKGROUND OF THE INVENTION

1. Field of the Invention

This invention relates to a process for the production of films in general, and in particular to vacuum evaporation processes for producing such films. More specifically, the invention relates to the production of a film of a direct band-gap semiconductor material on a substrate which is transparent to the emission produced by the semiconductor when pumped with an electron beam.

2. Discussion of the Prior Art

The advantages of a laser crystal in the form of a film on a substrate, such as higher efficiency and scannability, were recognized almost simultaneous with the invention of the laser. Processes for obtaining such laser crystals have recently been discovered. Two such processes are disclosed in United States applications for patents Ser. Nos. 849,450 now U.S. Pat. No. 3,692,572, and 887,650 now U.S. Pat. No. 3,730,764 filed Aug. 12, 1969 and Dec. 23, 1969 respectively; both applications are assigned to the same assignee as the present invention. While each of the inventions of these applications represents a significant step forward in the art, the substrates on which the films of these inventions are grown are either a platelet or a wafer. Presently, wafers suitable as substrates are only readily available in a size providing substrate surface areas about 1 cm$^2$; readily available platelets are even smaller.

SUMMARY OF THE INVENTION

The present invention relates to a vacuum evaporation process for the production of epitaxial thin-film Fabry-Perot cavities suitable for use as laser crystals. The process utilizes a reaction chamber having restricted openings for controlling the flow of vapors from the reaction chamber to a surrounding enclosure. Positioned within the chamber is a container containing as a source material, a sintered quantity of direct band-gap semiconductor material, and a substrate having a growth surface spaced from the source material. The process includes evacuating the surrounding enclosure to a pressure of less than 10$^{-5}$Torr, preheating the substrate to a temperature greater than a condensation-reaction temperature, heating the source material to an evaporation-reaction temperature, and after the source material reaches the evaporation-reaction temperature, allowing the substrate to cool to an equilibrium state wherein heat radiated within the reaction chamber as a result of continued heating of the source material maintains the substrate at the condensation-reaction temperature. Under such conditions, we have found that vapors of the source material will be deposited on the substrate growth surface as a uniform epitaxial thin-film Fabry-Perot cavity capable of producing laser emission. Control of the vapor flow from the reaction chamber is obtained by limiting the openings in the reaction chamber and by maintaining relatively low evaporation temperatures such that the pressure rise resulting from the production of source material vapors is kept at a relatively low value.

We have found that by following the foregoing described process, relatively large surface area epitaxial thin-film Fabry-Perot cavities are deposited on a heated substrate by vacuum evaporation, even though the resultant film composition and substrate have a large lattice mismatch. It is hypothesized that by such controlling of the vapor flow from the reaction chamber, the higher vapor pressure constituent elements are prevented from leaving the reaction chamber in significantly greater proportion than the lower vapor pressure constituent elements. And, by heating the interior surfaces to a temperature greater than the substrate temperature, such disproportionate losses through deposition onto the interior surfaces of the reaction chamber are further prevented. Apparently these heating and controlling steps provide a vapor which is a stoichiometric mixture of the constituent elements of the source material adjacent the substrate growth surface which results in epitaxial single crystalline growth. We have not found it necessary to maintain the entire interior surface area at a temperature higher than the growth surface temperature but have found that the surface area at a temperature equal to or lower than the substrate should be not more than about ten times the substrate growth surface area. Condensation of vapors of the source material onto the substrate growth surface is permitted only when the source and substrate have achieved predetermined evaporation and condensation temperatures.

According to one embodiment of the present invention, a film of a laseable material is grown on a micaceous substrate. Mica, acceptable for use as a substrate for growing a film usable as a laser crystal, is presently readily available having surface areas up to about 600 times larger than those of platelet and wafer substrates. An acceptable form of mica is sheet mica, i.e., the hydrous, potassium, aluminum silicate minerals characterized by excellent basal cleavage of American Standards for Testing Materials (ASTM) visual quality V-1, as defined in ASTM specification D 351-60T and commercially designated as "clear." The substrate should have its layers adhering; it is believed that when layers of a substrate are split, thermal gradients exist across the substrate growth surface and cause polycrystalline growth.

The source material should be of uniform particle size to stabilize the evaporation rate and preferably should be of a fine powder such as a powder having a grain size within the range of 0.3 to 0.9 microns. A source material which has been used successfully is commercial grade cadmium sulfide obtained from the Fisher Chemical Company which upon examination was found to have an average grain size of about 0.6 microns.

BRIEF DESCRIPTION OF THE DRAWING

The FIGURE of the Drawing is a cross-sectional view of a vacuum evaporation apparatus which may be used in practicing the process of the present invention.

DESCRIPTION OF THE PREFERRED EMBODIMENTS

A preferred embodiment of the process of my invention comprises providing a test growth surface and a source material of uniform particle size within a vacuum evaporation reaction chamber. During a pre-growth phase of the process, the temperature conditions required for epitaxial growth are determined by evacuating the evaporation chamber while evaporating source material and determining the temperatures of the source material and the test growth surface at which vapors from the source material deposit on the test growth surface as an adherent film as opposed to a loosely adhering powdery deposit of the source material. These predetermined temperatures shall hereinafter be referred to as the evaporation-reaction and the condensation-reaction temperatures. Having determined the requisite reaction conditions, a growth phase of the process is commenced. A substrate growth surface is exposed to source material vapors at a region in the reaction chamber at which the reaction conditions are the same as those of the region adjacent the test growth surface. The reaction conditions are then maintained for the desired time of growth by maintaining the substrate within 10° of the condensation-reaction temperature and by maintaining the source material temperature within 25° of the evaporation-reaction temperature; while maintaining the reaction chamber surfaces at a temperature greater than the substrate growth surface temperature and controlling the flow of vapor from the reaction chamber to not more than 10 times the instantaneous total vapor volume per second. To insure that deposits do not form on the substrate until the source material has reached the desired evaporation-reaction temperature, the substrate is directly heated to maintain the substrate temperature above the condensation-reaction temperature during initial heating of the source material.

Having generally described the invention, one example of an apparatus and steps by which one can make and use the invention shall now be described with reference to the drawing, a view of a vacuum evaporation apparatus in cross-section.

With reference to the drawing, a vacuum evaporation apparatus is shown generally as 10. The apparatus comprises a bell jar 12 containing means forming a reaction chamber, shown generally as 14. The components of the reaction chamber forming means 14 are drawn nearly to scale whereas the bell jar 12 is not. The bell jar is capable of being evacuated to at least $10^{-5}$ Torr and includes feedthroughs (not shown) which permit connection of electrical power, temperature sensors, and the like from the exterior into the interior of the reaction chamber means.

A heating coil 16 is positioned within concentric walls 18 and 20. The walls 18 and 20 are secured to a base 22. A container for holding a source material extends from a support 26 into the heating coil 16. Support 26 radiates heat produced by coil 16 into the region above support 26. The reaction chamber 14 is formed above support 26 by a cover glass 28 on top of wall 30. In the preferred embodiment shown, wall 30 is a cylinder provided with openings 31 to permit insertion into the reaction region of a thermally and electrically conductive strip 32 to which a substrate 34 has been attached. These openings 31 are kept small so that, during the growth period, the flow from the reaction chamber is a slow flow and is due almost solely to the diffusion of vapors as opposed to flow resulting from atoms traveling directly from the container and out through the openings. That is, by keeping these openings small, the primary forces for removing atoms from the reaction chamber result from diffusion kinetics. Accordingly, atoms should leave the reaction chamber in nearly stoichiometric proportions. Strip 32 is of reduced cross-sectional area in the area which mates with the substrate in order to facilitate heating of the substrate by resistance heating during the pre-growth phase.

Wall 30 and support 26 are radiatively heated and facilitate efficient radiative heating of the substrate while preventing radiative heat damage to the bell jar. The underside of the cover glass 28 is utilized as a test growth surface. Even though the spacing between the test growth surface and the substrate growth surface is significant compared to the spacing between the substrate growth surface and source material, when the substrate is heated radiatively it has been found that the growth conditions at the test and substrate growth surfaces are for all practical purposes the same. The source material and substrate are each provided with a thermocouple, shown as 40 and 42.

The apparatus of the drawing has been constructed using the following:

Bell Jar 12: 15 inch diam. × 15 inches high
Heating Coil 16: 31 mil. niobium double strand wire
Wall 18: Tantalum, 5 mil.
Wall 20: Tantalum, 5 mil.
Base 22: ¼ inch thick fired Lava (TM) (fired hydrous aluminum silicate); (TM) registered trademark of Minnesota Mining and Manufacturing Company.
Support 26: Tantalum, 5 mil.
Cover Glass 28: 4 inch diam. ⅛ inch thick watch glass
Wall 30: Tantalum shield 5 mil. approximately 3 inch diameter
Openings 31: ⅛ × ½ inch
Strip 32: 5 mil. thick by ½ inch wide Tantalum strips
Thermocouples 40 and 42: Platinum-Platinum Rhodium 10%

A preferred embodiment of the present invention by which the above-described apparatus is employed to produce a cadmium sulfide film laser crystal comprises evacuating the bell jar to less than $10^{-5}$ Torr with strip 32 removed and providing a uniform particle size source material 36 of commercial grade powder in container 24. During the process the reaction chamber is evacuated at a rate of 3000 cc/second by the vacuum system. The source material is slowly heated to a temperature at which the source material is sintered and outgassed.

Satisfactory completion of the sintering and outgassing is determined by observing the activity on the underside of the cover glass. For example, in one experiment when powders of commercial grade cadmium sulfide obtained from Fisher Chemical Company were outgassed and sintered, the source material was heated at a rate of about 700°C per hour. When the source temperature reached about 400°C, a blue haze was observed on the cover glass 28 around its periphery. As the source temperature increased to about 500°C, the bluish haze disappeared and was replaced by a yellowish, loosely adhering deposit. Whenever the deposit became so thick that it could not be seen whether deposits were continuing to form on the test surface, the bell jar was cooled to about room temperature and the cover glass removed, cleaned and replaced and the process repeated until no further depositing of the yellowish, loosely adhering deposit was observed.

It is believed that during such a sintering and outgassing step, the extremes of the source material particle sizes are reduced to an acceptable range. It is hypothesized that when the range is too large, the evaporation rate is not stable, but varies according to the distribution of particle sizes of the source material being evaporated with the smaller particles evaporating fastest to change the distribution until the range is sufficiently small that the rate of change is insignificant i.e., until the evaporation rate is stable. If this hypothesis is correct, it will of course be appreciated that sintering would not be required if the particle size of the source material powder was literally uniform.

When outgassing and sintering is complete, a pregrowth phase is initiated. A clean cover glass is provided and the source material is again slowly heated until an adherent, glassy film which appears visually to be of uniform transmissiveness appears on the underside of the cover glass. The appearance of such a film has been found to be determinative of the source evaporation-reaction temperature. It is also determinative of the substrate condensation-reaction temperature, as the test surface growth conditions, as previously stated, are for all practical purposes the same as those at the region adjacent which a substrate on a strip 32 is positioned. It will be appreciated that the evaporation and condensation-reaction temperatures are directly dependent on the source material particle size, and once determined for a particular source material need not be redetermined.

After determining the requisite growth conditions, a strip 32 carrying a substrate of the desired dimensions is inserted. The bell jar is evacuated to about $10^{-5}$ Torr and heating of the source material and direct heating of the substrate is commenced. When an adherent film is again observed on the cover glass, direct heating of the substrate is discontinued to permit the substrate temperature to decrease to the condensation-reaction temperature. Having established the required growth condition, heating of the source material is continued to maintain the source material at the evaporation-reaction temperature and to maintain the substrate at the condensation-reaction temperature through radiative heating.

For the apparatus constructed with the components of the foregoing table, it has not been necessary to maintain the substrate temperature by direct heating. Rather, it has been found that the substrate temperature follows the source material temperature closely enough by means of radiative heating such that the substrate temperature stays within 10° of the condensation-reaction temperature for source material variations within 25° of the evaporation-reaction temperature. Because of the relationship between the source and substrate temperatures, it has not been necessary to determine the actual temperature of the test growth surface at which the adherent film is formed; it is sufficient to note the source material temperature. In this connection, it should be noted that in the foregoing preferred process the source material temperature (i.e., the temperature at the surface where evaporation is taking place) is not literally determined. It has been found more practical, and sufficient, to indirectly determine the source material temperature by placing a thermocouple in an indentation of a crucible containing the source material as shown in the drawing.

For the Fisher Chemical Company commercial grade powder previously referred to and the apparatus of the drawing, the evaporation-reaction temperature was determined to be about 700°C and the condensation-reaction temperature to be within a range of 280° to 300°C, the condensation and evaporation reaction temperatures, once determined, having a variability of ± 10°C and ± 25°C respectively. The evaporation-reaction temperature of 700°C was the temperature at the surface of the source material, and not the temperature measured with the thermocouple in the crucible base.

Epitaxial films of CdS grown on mica from Fisher Chemical Company commercial grade powders were characterized by a surface which to the unaided eye appeared glassy and of uniform transmissiveness. Analysis of the film surfaces by reflection electron diffraction techniques produced patterns in the form of ordered, as opposed to randomly located, spots which showed the surfaces to be relatively perfect. Microscopic photos of the surfaces showed "imperfection" concentrations as low as $10^5/cm^2$. Imperfections of such concentrations accounted for less than 15% of the film surface area. The imperfections were almost exclusively "pointed" and "flat-topped" hillocks. The hillocks had a cross-section (in the plane of the film) which was hexagonal and provided further evidence of the epitaxy of the film as the hillocks all had the same orientation. The flat-topped hillocks were grown preferentially and in excess if the source temperature was raised 20°C above the evaporation reaction temperature, whereas pointed hillocks grew preferentially and in excess for source temperatures about 50°C above the evaporation temperature.

By a process according to the present invention and using the foregoing described apparatus, we have grown films which produced laser emission. A 5 micron-thick cadmium sulfide film was grown on a mica substrate. The film was grown from Fisher Chemical Company commercial grade powder. The cadmium sulfide film-substrate combination was determined to have an optical Fabry-Perot cavity and to be capable of producing laser emission. The exposed film surface was coated with a nearly 100% reflective coating of silver and the mica substrate surface opposite the exposed film surface was coated with silver about 85% reflective. When the nearly 100% reflective coating of the structure (the structure "gun" side) was bombarded with a 45 Kev pulsed (100 ns pulses at 60 pulses per second) beam of electrons having a low current density (approximately 2 amps per cm²), the film produced a spontaneous emission spectrum having two dominant peaks, a relatively narrow one peaking at about 4950 A and a second one at 5200 A. The spectrum was of the emission emitted from the 85% reflective coating side (the "emission" side) of the structure. When the current density was increased to about seven amps per cm², coherent directional emission coaxial with the bombarding beam was visually observed to emerge from the emission side of the structure. By intercepting the emission with a fluorescent screen, the emission was found to be axially symmetric and to have a half angle of approximately 10°. This coherent emission had a stimulated emission spectrum which exhibited line narrowing and the peak previously referred to as the narrow peak of the spontaneous region spectrum appeared as a still narrower peak at approximately 4985 A.

It is to be understood that the foregoing is given by way of example rather than limitation. In particular, it is to be understood that the invention is not restricted to growth of cadmium sulfide on mica but is intended to encompass, among others, direct band-gap semiconductors grown on mica and other single crystalline substrates as well. As used herein, a "direct band-gap" semiconductor is a material in which the minimum energy in the conduction band lies at substantially the same position in the Brillouin zone as the maximum energy in the valence band.

What is claimed is:

1. A vacuum evaporation process for producing an epitaxial thin-film Fabry-Perot cavity suitable for use as a laser crystal, comprising the steps of:
   a. positioning within a reaction chamber having restricted openings for controlling the flow of vapors from the reaction chamber to a surrounding enclosure, a container containing as a source material a quantity of a direct band-gap semiconductor material, and further positioning within said reaction chamber a substrate having a test growth surface spaced from said source material;
   b. evacuating said surrounding enclosure to a pressure of less than $10^{-5}$ Torr,
   c. heating said source material to sinter and out-gas said material until only an adherent film is observed to form on said test growth surface, and determining the source material and test growth surface temperatures at which said film is formed as an evaporation-reaction temperature and a condensation-reaction temperature, respectively;
   d. positioning within said reaction chamber at a region in which the growth conditions are the same as at the test growth surface, a crystalline substrate having a growth surface;
   e. preheating said crystalline substrate to a temperature greater than said condensation-reaction temperature;
   f. heating said source material to said evaporation-reaction temperature;
   g. terminating said step of preheating said substrate after said source material has reached said evaporation-reaction temperature thereby allowing said growth surface to cool to an equilibrium state wherein said growth surface is maintained at said condensation-reaction temperature by heat radiated within said reaction chamber as a result of continuing to heat said source material, thereby causing vapors of said source material to be deposited as a uniform epitaxial film on said substrate growth surface; and
   h. terminating said step of heating said source material when said uniform epitaxial film is formed.

2. A process according to claim 1, wherein the step of preheating the crystalline substrate comprises providing a thermally and electrically conductive strip to which said substrate is affixed and resistance heating said strip while heating the source material until the source material reached said evaporation-reaction temperature.

3. A process according to claim 1, wherein said direct band-gap semiconductor source material comprises cadmium sulfide; wherein the condensation-reaction temperature is between 280° and 300° C, and wherein the evaporation-reaction temperature is between 675° and 725° C.

4. A process according to claim 1, wherein said step of heating the source material further comprises heating the walls of the reaction chamber to a temperature greater than said condensation-reaction temperature and less than said evaporation-reaction temperature to minimize deposition on said walls of vapors produced by heating said source material.

5. A process according to claim 1 further comprising selecting as said crystalline substrate a material which is optically transparent to the electro-magnetic radiation produced upon stimulation of said film.

6. A process according to claim 5 comprising selecting as said crystalline substrate a single crystal of mica having adjacent self-adhering layers.

7. A process according to claim 6 comprising selecting a said single crystal of mica having a growth surface area in excess of 1 cm², whereby a said uniform epitaxial film is deposited over said growth surface such that a Fabry-Perot cavity is created over substantially the entire growth surface area of the substrate.

8. An epitaxial thin-film Fabry-Perot cavity of a direct band-gap semiconductor on a mica substrate, which cavity is suitable for use as a laser crystal, prepared according to the process of claim 6.

* * * * *